(12) United States Patent
Weaver et al.

(10) Patent No.: US 9,027,619 B2
(45) Date of Patent: May 12, 2015

(54) SPLIT PLY TIRES AND BEAD AREA MONOCOMPONENTS

(75) Inventors: Douglas Raymond Weaver, Uniontown, OH (US); Steven Leonard Kitz, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 393 days.

(21) Appl. No.: 13/206,603

(22) Filed: Aug. 10, 2011

(65) Prior Publication Data
US 2013/0037195 A1 Feb. 14, 2013

(51) Int. Cl.
| | |
|---|---|
| B60C 15/06 | (2006.01) |
| B60C 9/00 | (2006.01) |
| B60C 9/02 | (2006.01) |
| B29D 30/50 | (2006.01) |
| B60C 15/00 | (2006.01) |
| B29D 30/48 | (2006.01) |

(52) U.S. Cl.
CPC ....... B60C 9/0207 (2013.01); *Y10T 428/24628* (2015.01); *Y10T 428/21* (2015.01); B29D 30/50 (2013.01); *B29D 2030/482* (2013.01); *B29D 2030/486* (2013.01); B60C 15/0072 (2013.01); B60C 9/0292 (2013.01)

(58) Field of Classification Search
CPC .................................. B60C 15/06; B60C 9/00
See application file for complete search history.

(56) References Cited

U.S. PATENT DOCUMENTS

| | | | | |
|---|---|---|---|---|
| 1,670,044 A | * | 5/1928 | Pierce | 245/1.5 |
| 1,943,275 A | * | 1/1934 | Lerch | 264/275 |
| 4,341,250 A | | 7/1982 | Welter | |
| 4,495,976 A | * | 1/1985 | Makino et al. | 152/543 |
| 4,661,020 A | * | 4/1987 | Nickles, Jr. | 405/227 |
| 4,782,880 A | | 11/1988 | Staab | |
| 4,933,034 A | | 6/1990 | Kokubu et al. | |
| 5,080,738 A | | 1/1992 | Araki et al. | |
| 5,435,370 A | | 7/1995 | Ahmad et al. | |
| 6,630,045 B1 | | 10/2003 | Roedseth | |
| 6,913,052 B2 | | 7/2005 | Losey | |
| 7,044,180 B2 | * | 5/2006 | Rhyne et al. | 152/158 |
| 7,631,676 B2 | | 12/2009 | Sandstrom et al. | |
| 2004/0123937 A1 | | 7/2004 | Losey | |

FOREIGN PATENT DOCUMENTS

| | | | |
|---|---|---|---|
| CA | 1302853 | | 6/1992 |
| EP | 1897681 | | 3/2008 |
| GB | 788711 | * | 1/1958 |
| GB | 1589324 | * | 5/1981 |
| JP | 53-57282 | * | 5/1978 |
| JP | 6-190945 | * | 7/1994 |
| JP | 10193914 | * | 7/1998 |
| JP | 2003039916 | | 2/2003 |
| WO | 2010069838 | | 6/2010 |

OTHER PUBLICATIONS

Machine translation of JP 10193914, 1998.*

* cited by examiner

*Primary Examiner* — Justin Fischer
(74) *Attorney, Agent, or Firm* — David L. King

(57) ABSTRACT

An intermediate article of manufacture formed as a first stage bead area subassembly for a split ply pneumatic tire carcass is disclosed. The bead area subassembly has an annular bead core; a bead apex; a ply strip; and preferably a sidewall affixed to the ply strip. The subassembly is formed into a disk-shaped bead area monocomponent. The ply strip is wrapped about the bead core and the apex to form a ply turnup and both the ply strip and the ply turnup extend radially outwardly from the bead core. The bead area subassembly when formed into the disk-shaped bead area monocomponent is placed on an annular holder device. The combination of the bead area monocomponent on the holder device can be stacked for storage and latter assembly into a split ply carcass. Preferably, the ply turnup can be oriented extending inside or axially inward of the bead core on final assembly to form a split ply tire having axially inside turnups. In the preferred embodiment the ply strip is reinforced by radially extending ply cords.

3 Claims, 13 Drawing Sheets

SPLIT PLY TIRES AND BEAD AREA MONOCOMPONENTS

TECHNICAL FIELD

The present invention relates to pneumatic tires generally, more specifically to split ply tire constructions and their method of manufacture.

BACKGROUND OF THE INVENTION

A conventional radial ply tire has a single carcass ply extending between a pair of axially spaced bead cores which is wrapped about each bead core having axially outer ply turnup ends. This construction has the main working part of the ply turned inside of a bead apex forcing a curvature in the ply path when the tire is mounted onto a rim. This curvature gives the radial tire a fat bulging appearance in the tire footprint when under load.

Attempts to avoid this sidewall curvature change about the bead and bead apex have led some to attempt a ply path that wraps about the bead and has the turnup end wrap inside of the bead and bead apex. In this construction the turnups are positioned inside the beads and the ply path avoids the normal curvature change. This provides a better performing tire in terms of bead area durability and overall tire performance.

Unfortunately, such a tire when made with a single carcass ply is difficult to mass produce because the inside turnups are not conducive to conventional tire building.

In U.S. Pat. No. 6,913,052 B2 assigned to The Goodyear Tire & Rubber Co., a split ply structure and method of manufacture was proposed wherein inextensible steel plies could be made with inside turnups. The advantages being improved bead durability and significantly reduced weight reduction. In this patent the method of building the tire having a carcass assembly having a pair of bead cores and a radial ply reinforcing structure has the steps of cylindrically applying a pair of radial cord reinforced sidewall plies, each sidewall ply having a width Wp; setting one bead core over each sidewall ply and fixing the axial spacing between the bead cores at a distance L; applying a crown ply having a width WC, WC being less than the distance L and the crown ply being interposed between and spaced from each sidewall ply when applied; turning up each sidewall ply to fold over and overlap the lateral edges of the crown ply; moving the carcass assembly axially inwardly while shaping the carcass assembly toroidially to form ply turnups axially inward of the bead cores. The step of stitching the overlap of the sidewall plies to the crown ply is recommended. Once toroidially shaped the method can further include applying a belt reinforcing structure to the toroidially shaped carcass, the first belt reinforcing layer having a width WB, the first belt layer overlaps the radially outer ends of the sidewall plies. Then an additional one or more belt reinforcing layers can be applied to the carcass as well as applying the tread.

This method of cylindrically forming the split ply carcass as a complete stage 1 assembly allowed the second stage toroidal assembly of the belts and tread similar to conventional tire building.

The method and resultant prior art tire while novel did not take full advantage of the split ply features and as a practical matter was not that different from conventional tire building.

The present invention discloses a new and unique assembly of a bead area monocomponent that can be made as an intermediate article of manufacture in a first stage building method and then can be assembled later as an intermediate article of manufacture into a second stage toroidaly shaped green split ply carcass assembly along with the belt structure and tread to form an uncured tire assembly.

The present invention has the objectives of allowing a simplified assembly of the bead area monocomponents; provide allowance for a range of tire sizes to be made from one size of the monocomponent; the method employs a molded hub device for bead carrying and centering as well as holding the completed intermediate articles of manufacture for storage once formed as a subassembly. These and other objectives are disclosed as follows.

SUMMARY OF THE INVENTION

An intermediate article of manufacture formed as a first stage bead area subassembly for a split ply pneumatic tire carcass is disclosed. The bead area subassembly has an annular bead core; a bead apex; a ply strip; and preferably a sidewall affixed to the ply strip. The subassembly is formed into a disk-shaped bead area monocomponent. The ply strip is wrapped about the bead core and the apex to form a ply turnup and both the ply strip and the ply turnup extend radially outwardly from the bead core. The bead area subassembly when formed into the disk-shaped bead area monocomponent is placed on an annular holder device. The combination of the bead area monocomponent and the holder device can be stacked for storage and latter assembly into a split ply carcass. Preferably, the ply turnup can be oriented extending inside or axially inward of the bead core on final assembly to form a split ply tire having axially inside turnups. In the preferred embodiment the ply strip is reinforced by radially extending ply cords.

The assembly can be used in a split ply pneumatic tire. The tire has an inner liner; a pair of bead area monocomponents pre-formed as a disk-shaped single subassembly, a crown ply overlapping and extending over ends of ply strips of each monocomponent, the crown ply and ply strip ends being stitched together; a belt reinforcing structure overlaying the crown ply and ends of the ply strips to form the split ply casing; and a tread overlaying the split ply casing. Each bead area monocomponent includes a bead core, a bead apex, a gum chafer, a ply strip and a sidewall, the pair of bead area monocomponents overlaying the inner liner and being spaced to form the side portions of a split ply carcass. The monocomponents are identical as formed and one monocomponent is rotated 180 degrees to form an opposite side of the split ply carcass. Each of the ply turnups is preferably oriented to be axially inside the tire carcass relative to the split ply, bead core and bead apex and the split plies are, preferably, reinforced by radially extending cords.

A method of forming an article of manufacture formed as a first stage bead area subassembly for a split ply pneumatic tire carcass has the steps of: providing a first stage building drum having a single inflatable turnup bladder, a single set of bead locks and an expandable set of center segments and a plurality of separate molded hubs for delivering the beads and removing and storing the finished subassembly; applying a gum chafer strip cylindrically onto the bladder turnup adjacent the expandable set of center segments; applying a ply strip cylindrically over the gum chafer strip; delivering a bead core held by a molded hub and positioning the bead core overlaying the gum chafer strip and the ply strip over the single set of bead locks; clamping the bead core and removing the molded hub; expanding the set of expandable center segments turning radially upwardly a portion of the ply strip; applying a bead apex against the bead core and the turned up portion of the ply strip; inflating the turnup bladder moving the remaining portion of the ply strip about the bead core and bead apex and ply strip turnup to form a radially extending disk-shaped bead area monocomponent. The method of forming an article of manufacture formed as a first stage bead area subassembly for a split ply pneumatic tire carcass further may include the step of applying a sidewall against the ply strip to complete the bead area monocomponent. Preferably, the apex is applied from a gear pump and extruded onto the bead core and turnup and similarly the sidewall is applied from a gear pump and extruded onto the split ply. Alternatively, the apex and sidewall can be applied from cut to length strips.

The method forming an article of manufacture formed as a first stage bead area subassembly for a split ply pneumatic tire carcass further may have the steps of moving the molded hub over the first stage building drum to attach or hold the finished bead area monocomponent; and removing the molded hub with attached bead area monocomponent and stacking the molded hub with an attached bead area monocomponent into stacks for storage and latter assembly.

DEFINITIONS

As used herein and in the claims,

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner liner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Pneumatic tire" means a laminated mechanical device of generally toroidal shape (usually an open-torus) having bead cores and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that component which comprises a portion of the outside surface of a tire between the tread and the be "Shoulder" means the upper portion of sidewall just below the tread edge.

"Sidewall" means that portion of a tire between the tread and the bead.

"Tire industry standard size" refers to the series of letters and numbers used by tire manufacturers to define a tire's characteristics. The series includes such factors as tire width, aspect ratio (height to width), radial/bias type, rim diameter, speed rating, and load rating.

"Tread" means a molded rubber component which, when bonded to a tire casing, includes that portion of the tire that comes into contact with the road when the tire is normally inflated and under normal load.

"Tread Width or Tread Arc Width" means the arc length of the road-contacting tread surface in the axial direction, that is, in a plane parallel to the axis of rotation of the tire.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 shows the gum chafer strip positioned under the ply strip with the bead core affixed to a molded holder being positioned in place as shown.

FIG. 2 shows the bead holder withdrawn and removed from the building drum.

FIG. 3 shows the radially expandable drum center segments expanded causing the turnup to fold radially upwardly and an apex strip being extruded onto the bead core and against the turnup.

FIG. 4 is a schematic view of the turnup bladder being inflated causing the ply strip to be oriented radially outwardly thus shaping the bead area monocomponent into a disk-shape.

FIG. 5 is a schematic view of a sidewall being formed against the ply strip completing the disk-shaped bead area monocomponent.

DETAILED DESCRIPTION OF THE INVENTION

Figure 6:
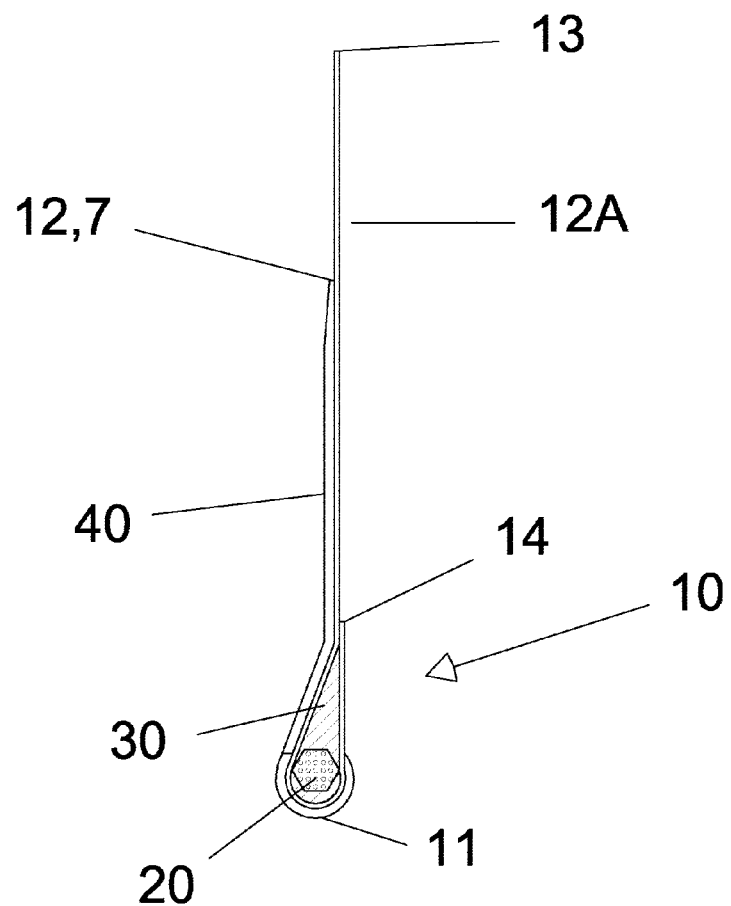
FIG. 6 is a cross sectional view of the disk-shaped monocomponent made according to the present invention.

With reference to FIG. 6, a cross sectional view of the disk-shaped bead area monocomponent made according to the present invention is illustrated. As shown, the monocomponent 10 has a bead core 20. The bead core 20 is made of substantially inextensible wires wrapped around to form an annular ring. Directly above the bead core 20 is an elastomeric apex 30. The apex 30, shown in a somewhat triangular form, is positioned and provides an elastomeric spacer between the ply strip 12 and the ply turnups 14 as illustrated. The ply turnup 14 as shown extends to a turnup end 14A which is stitched directly onto the working portion or outside ply portion 12A of the ply strip 12. The ply strip 12 wrapping about the bead core 20 as shown provides the opportunity to have an inside ply ending or turnup 14 relative to the bead core 20. On the outside of the ply strip 12 is the working portion of the ply which extends to a radially outer end 13 as illustrated and affixed to the outer surface of the ply strip 12 is a rubber or elastomeric sidewall portion 40 which extends along a portion of the outside of the ply strip 12 downward to the gum chafer 11. The gum chafer 11 is applied to the ply strip 12 and both wrap directly under the bead core 20 up and around the bead as illustrated. The gum chafer 11 provides a durable rubber element to prevent rim chaffing when mounted on a tire rim. These components as shown are assembled and provided as a simple relatively flat disk-shaped bead area monocomponent for use in making a split ply carcass for a split ply tire assembly.

Figure 10:
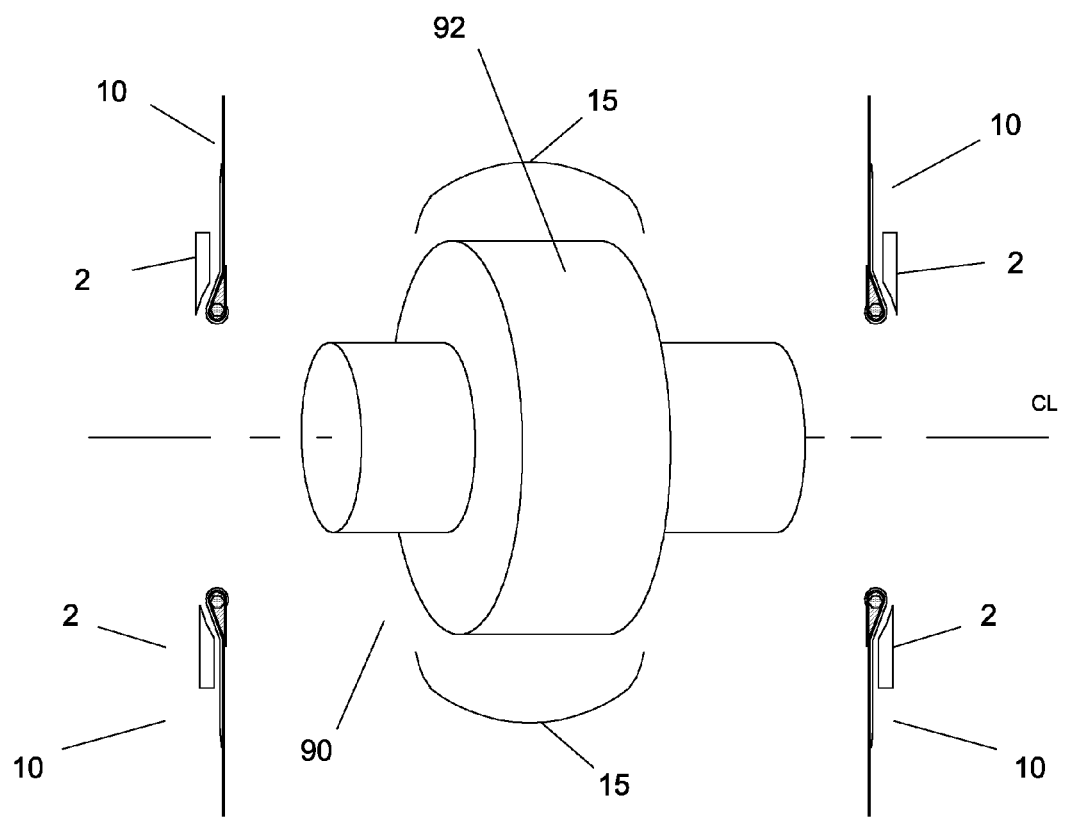
FIG. 10 shows the molded hub placing the disk-shaped monocomponent onto a second stage building machine.
Figure 11:
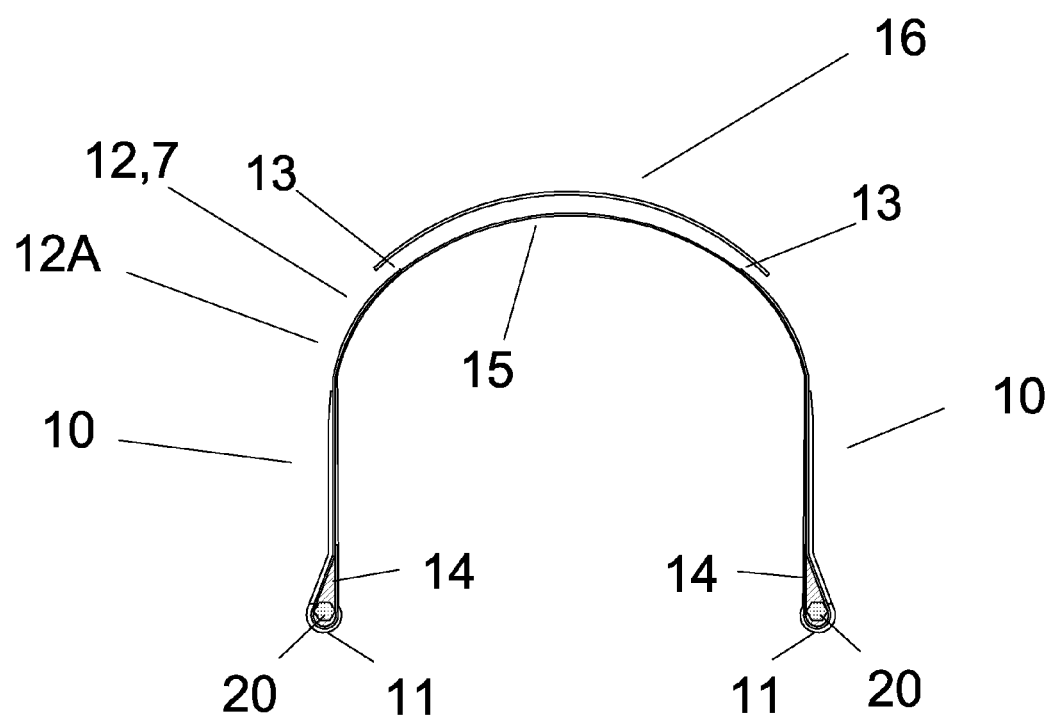
FIG. 11 is the schematic cross sectional view of a split ply carcass having a pair of the disk-shaped monocomponents of the present invention.

With reference to FIGS. 10 and 11 a schematic cross sectional view of a split ply carcass is shown using a pair of the disk-shaped monocomponents 10 of the present invention. The pair of disk-shaped monocomponents 10 preferably is positioned on each side of a second stage building drum 90 on a radially expandable mandrel 92 overlying a substantially air impervious inner liner 15 and the radially outer ply endings 13 are covered by a reinforcement crown ply 16. As shown the split plies 12 preferably are reinforced by cords 7, the cords 7 can be textile, rayon, polyester, aramid, or alternatively can be made out of steel if so desired. When so produced the monocomponent 10 is positioned such that the turnup 14 is provided axially inward of the bead core 20 in such a fashion that the working ply portion 12A of the ply strip 12 is on the axially outer side of the tire relative to the bead cores 20 and extends upward to the crown ply. The positioned crown ply 16 is stitched directly onto the ends of the monocomponent 10 at the ply strip ending 13 in such a fashion that the crown ply 16 extends from both ply strips 12 to form the split ply carcass structure as shown.

Figure 12A:
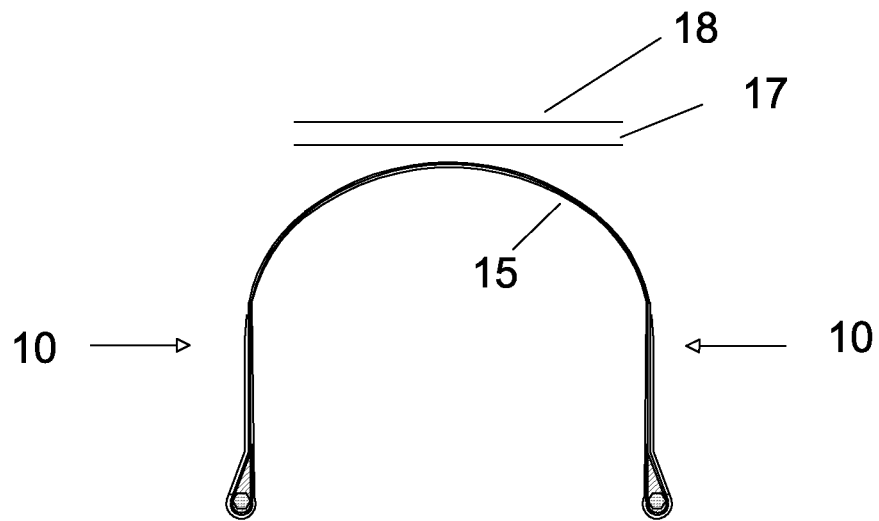
FIG. 12A is a schematic view of an unvulcanized split ply casing with belt reinforcement applied onto the carcass.
Figure 12B:
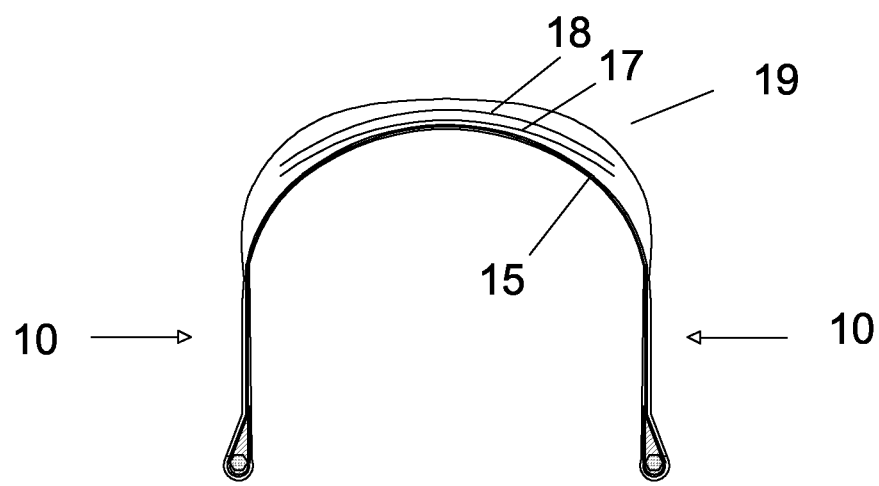
FIG. 12B is the split ply tire schematic with a tread added to the casing to complete the assembly.

Once the carcass is assembled as shown in FIG. 11 using the pair of disk-shaped monocomponents 10 of the present invention, it can be formed into a split ply casing with the addition of belt reinforcement plies 17, 18 applied onto the carcass overlaying the crown ply 16 and the ends 13 of each of the ply strips 12. This is shown in FIG. 12A. With reference to FIG. 12B once the belt reinforcement plies 17, 18 have been added to form a casing, the entire assembly can be completed by the application of a tread 19 applied over the belt reinforcements 17, 18 and extending to the sidewall 40 of the monocomponent 10 as illustrated. As can be easily appreciated, the bead area monocomponent 10 being formed in a flat disk-shape makes it quite convenient for producing a tire such that inside turnups 14 can be provided on a split ply carcass in such a way that all of the sidewall components including the bead 20, gum chafer 11, sidewall 40, apex 30 and the sidewall split ply strip 12 can be provided as a single unitary component. By having one of the monocomponents 10 rotated 180 degrees relative to the other enables the opposite side of the tire to be built such that an inside turnup is also achieved on the opposite side of the tire casing using the same identical monocomponent 10.

One of the advantages of the disk-shaped bead area monocomponent 10 as illustrated is that a variety of tire sizes can be made using a single component structure. This is possible because the width of the tire can be changed by providing a longer or wider width crown ply 16 such that the beads can be moved outwardly and wider tires can be produced. Alternatively, a narrower crown ply will produce a narrower tire assuming the sidewalls all have the same length. Alternatively, the tire can be produced even with different sidewall heights using the same components simply by increasing or reducing the amount of overlap between the crown ply and the sidewall ply if so desired. While this is normally not preferred due to wastage, in some cases where an over extension of overlap material is used it is possible to make tires of varying widths and sidewall dimensions simply by varying the amount of tread rubber that is applied adjacent to the sidewall. In such a fashion that an upper portion of the tread may extend downward a litter farther than normal and this would enable the assembly to produce a variety of sizes of both different widths and different heights. It is believed preferable that only tires of different widths be constructed using the same sidewall lengths in that specifically designed tires having additional sidewall rubber can be applied for taller tires if so needed or if a lower aspect ratio shorter tire sidewall is needed less sidewall rubber can be applied. In this fashion it is possible that the sidewall rubber can be applied at the second stage and that the monocomponent 10 could be made without including the sidewall rubber, in that case tires of any size could be produced using a single monocomponent 10 in a disk-shape as illustrated. In that case the sidewall rubber would be applied as the second stage of the building process. While this is not the preferred embodiment, the preferred embodiment method of assembly includes the use of the sidewall 40 as part of the first stage building which will be described as follows in reference to FIGS. 1-5.

Figure 1:
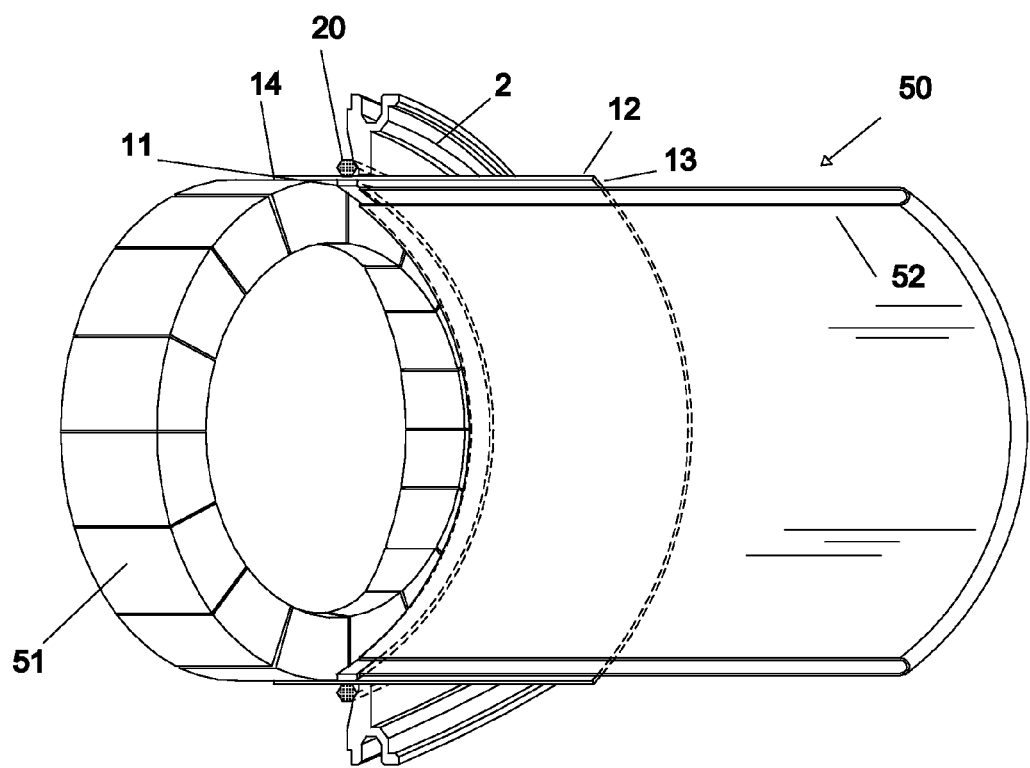
FIGS. 1-5 are partial cut-away perspective views of a simplified first stage building drum for building the disk-shaped bead area monocomponent of the present invention.
Figure 2:
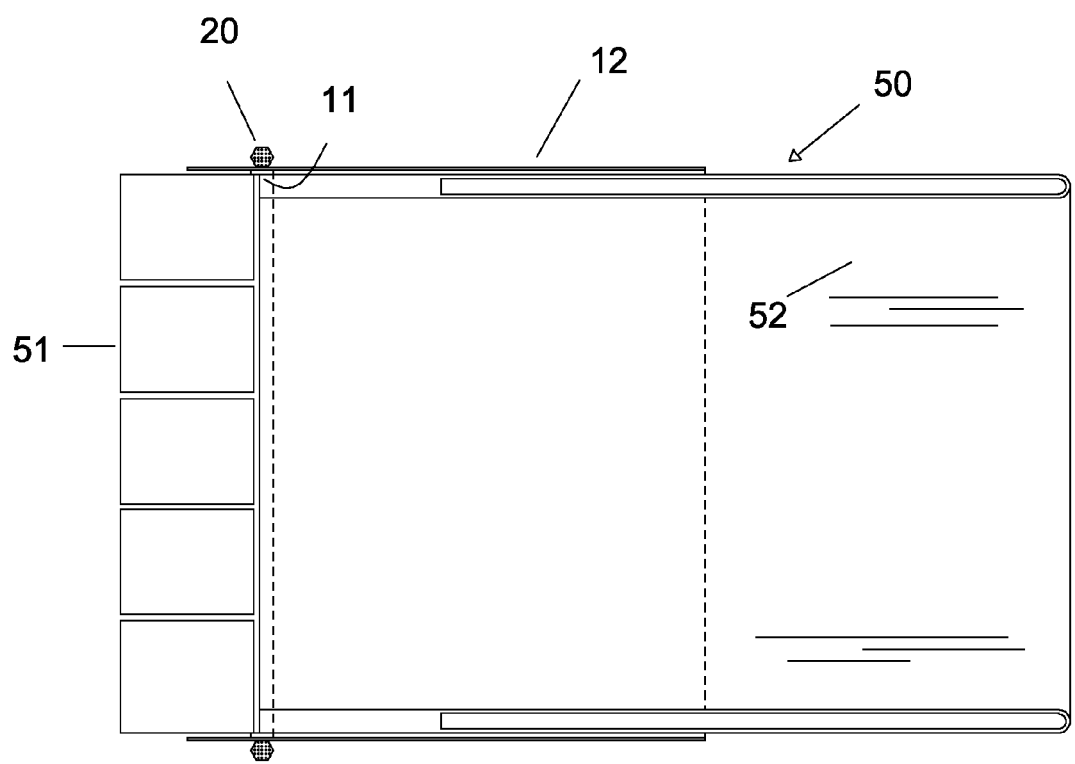
Figure 2A:
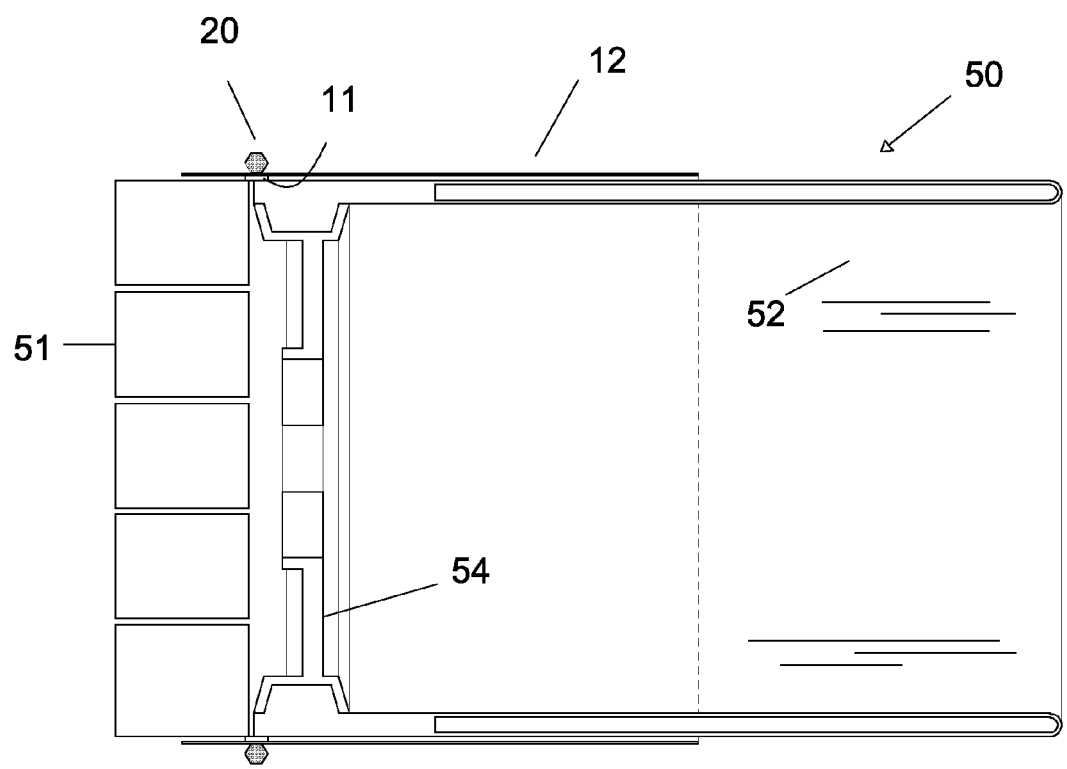
FIG. 2A shows the exemplary bead lock fingers added to the view of the building drum showing how the bead core is locked onto the building drum.
Figure 3:
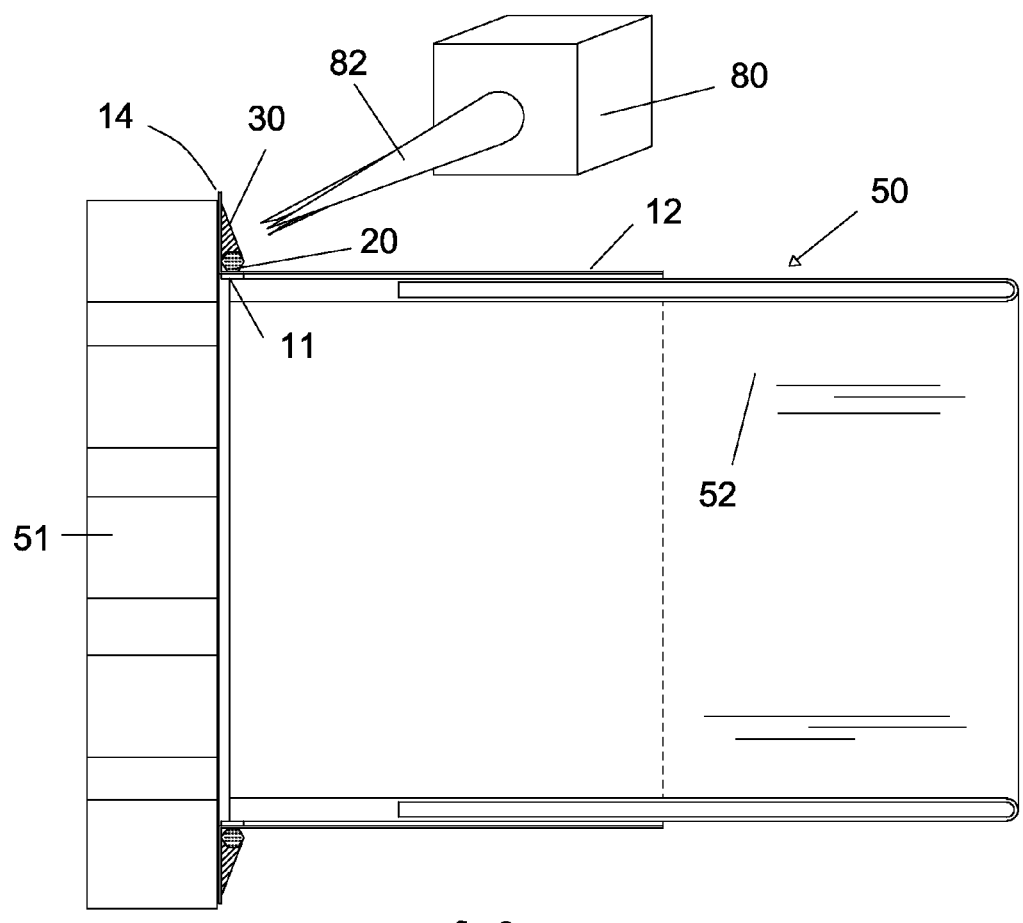

In order to make the disk-shaped monocomponent 10 of the present invention, it is important to use a modified or simplified first stage building drum 50. The method of assembly is shown in FIGS. 1-5 wherein the disk-shaped bead area monocomponent 10 of the present invention is shown being assembled at a modified first stage building drum 50. A unique feature of this first stage assembly is that the building drum 50 is only basically half of a normal or conventional first stage building drum 50 in that it has only one set of drum center segments 51 that are radially expandable and has a single turnup bag or bladder 52 attached to the first stage building drum 50 and one set of bead locks 54. The bead locks are not shown in FIG. 1, however are shown in FIG. 2A. The bead locks 54 are expandable and retractable to provide a way of securing the bead 20 when the bead core 20 is positioned over the first stage building drum 50. As shown, the bead core 20 is delivered over the turnup bladder 52 as shown in FIG. 1 by means of a molded hub 2, the molded hub 2 can be moved robotically over the bead lock area as shown in FIG. 2A. When positioned the molded hub 2 can hold the bead core 20 which is made substantially of steel wires by using a magnetic element within the bead holder 2 or alternatively can use pins to support the bead core 20. During assembly, the bead core 20 is moved into position over both a previously applied cylindrical gum strip 11 which is covered by a ply strip 12 has been cylindrically applied. As shown in FIG. 1, the gum strip 11 is positioned somewhat centrally under the position of the bead core 20 and the ply strip 12 is positioned such that a portion 14 of the ply strip 12 extends over the radially expandable drum center segment 51 and another portion 13 of the ply strip 12 extends over the inflatable bladder 52 as shown in FIG. 1. The portion 14 of the ply strip 12 that extends over the radially expandable center segments 51 forms a ply turnup 14 as will be discussed later. Once the bead holder 2 has moved the bead core 20 into position over the cylindrically formed components 11 and 12 already applied to the first stage building drum 50, as shown in FIG. 2A, the bead locks 54 can move out radially locking the bead core 20 into position. At that point, the bead holder 2 is removed. Once the bead core 20 is locked in place, the radially expandable center segments 51 are radially moved outwardly as shown in FIG. 3, when this occurs the turnup 14 is formed oriented vertically as illustrated extending out radially from the bead core 20. As shown in FIG. 3, a gear pump 70 with a nozzle 72 is shown positioned feeding elastomeric material to form a triangular shaped bead apex 30 directly onto the bead core 20 and against the turnup 14.

Figure 4:
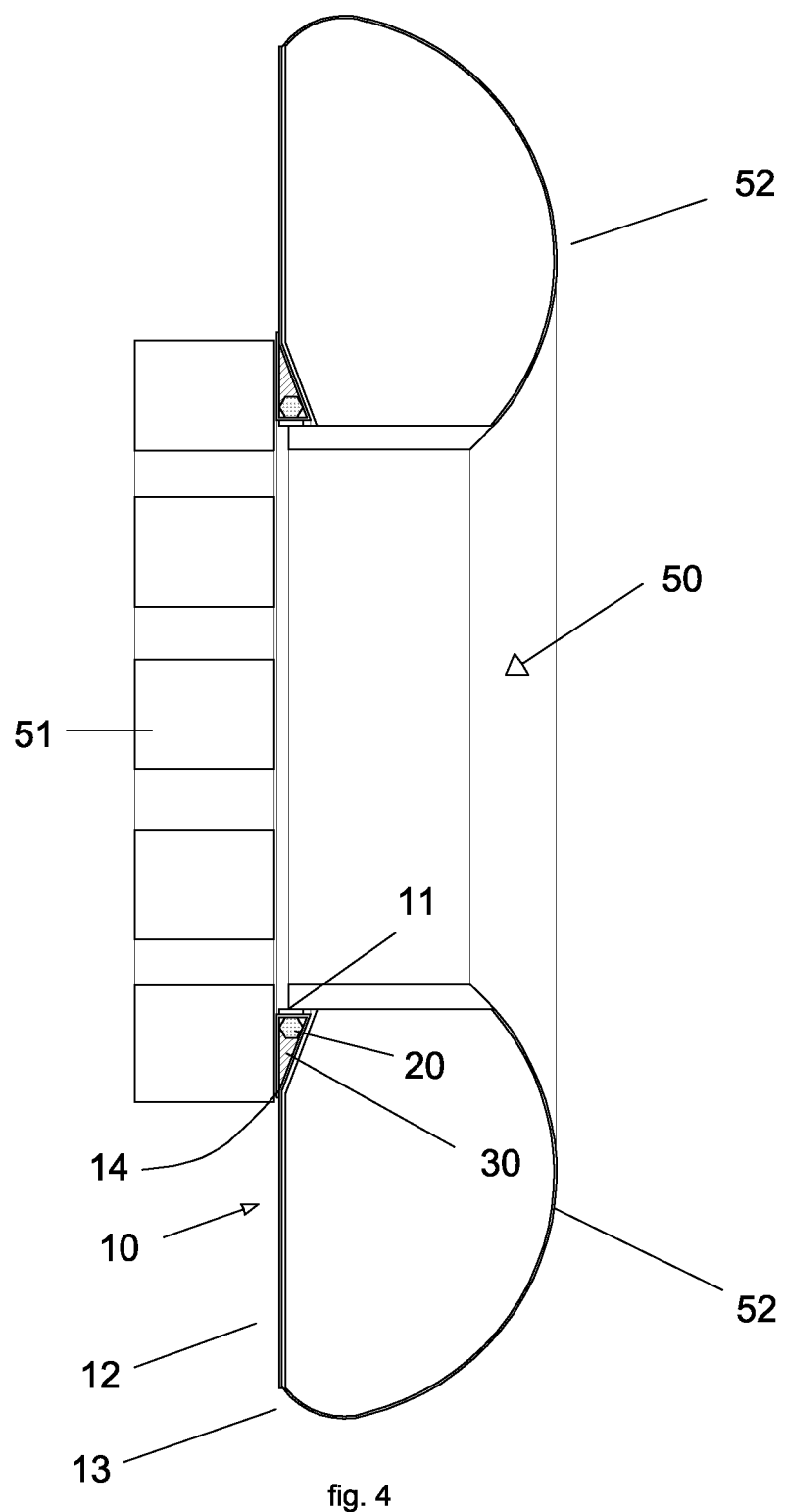
Figure 5:
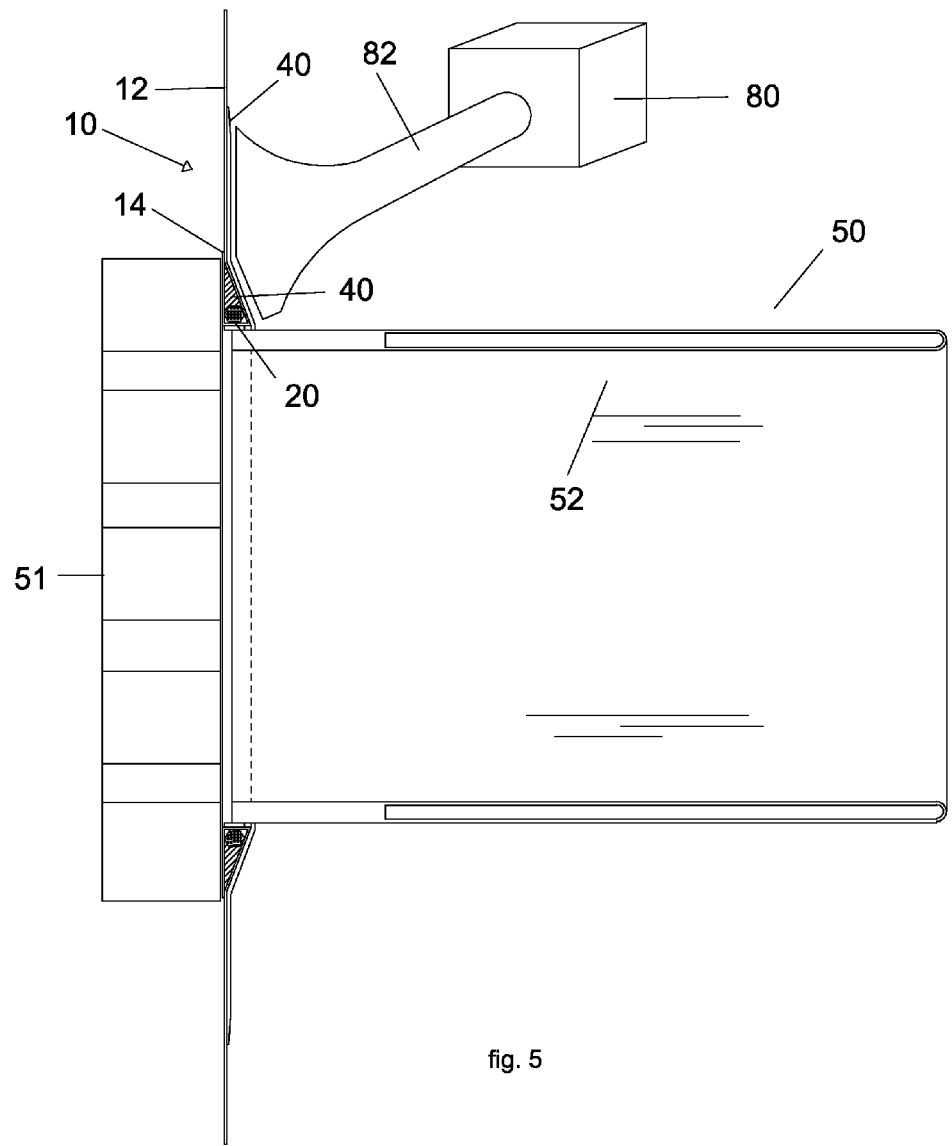

Alternatively, this bead apex 30 can be pre-formed as a strip and simply positioned onto the bead core 20 against the turnup 14 if so desired without applying it in this hot form method shown using the gear pump 70 and extruder. This assembly has now created the ply strip 12 with a gum strip 11 and an apex 30 and a bead core 20. In FIG. 4 the turnup bag or bladder 52 is inflated and the remaining portion of the ply strip 12 is pushed against the bead core 20 and the apex 30 and extends radially outwardly as illustrated. When this occurs, the bead area monocomponent 10 assembly is virtually complete as a single piece disk-shaped bead area monocomponent 10. As shown in FIGS. 3, 4, 5 and 6 as well as FIG. 9, the annular bead core 20 has an axis and the ply strip 12 and the ply turnup 14 are wrapped about the bead core 20. The ply strip follows a contour of the bead apex 30 and thereafter the ply strip 12 and the ply turnup 14 are oriented directionally perpendicular relative to the axis of the bead core 20 and extend radially from the bead core taking a generally flat disk shape when so assembled to form the monocomponent 10 as an intermediate article of manufacture formed as a first stage bead core area subassembly for a split ply pneumatic tire carcass. As shown in FIG. 5, additionally a sidewall rubber can be applied to this disk-shaped bead area monocomponent 10 as shown. In this case a gear pump 80 with an extruder nozzle 82 is shown positioned in such a fashion to deliver sidewall rubber 40 along the side of a portion of the ply strip 12. This hot formed sidewall strip 40 is then adhered directly onto the monocomponent 10 as illustrated. Once this assembly is completed the monocomponent 10 can be removed from the first stage building drum 50.

Figure 9:
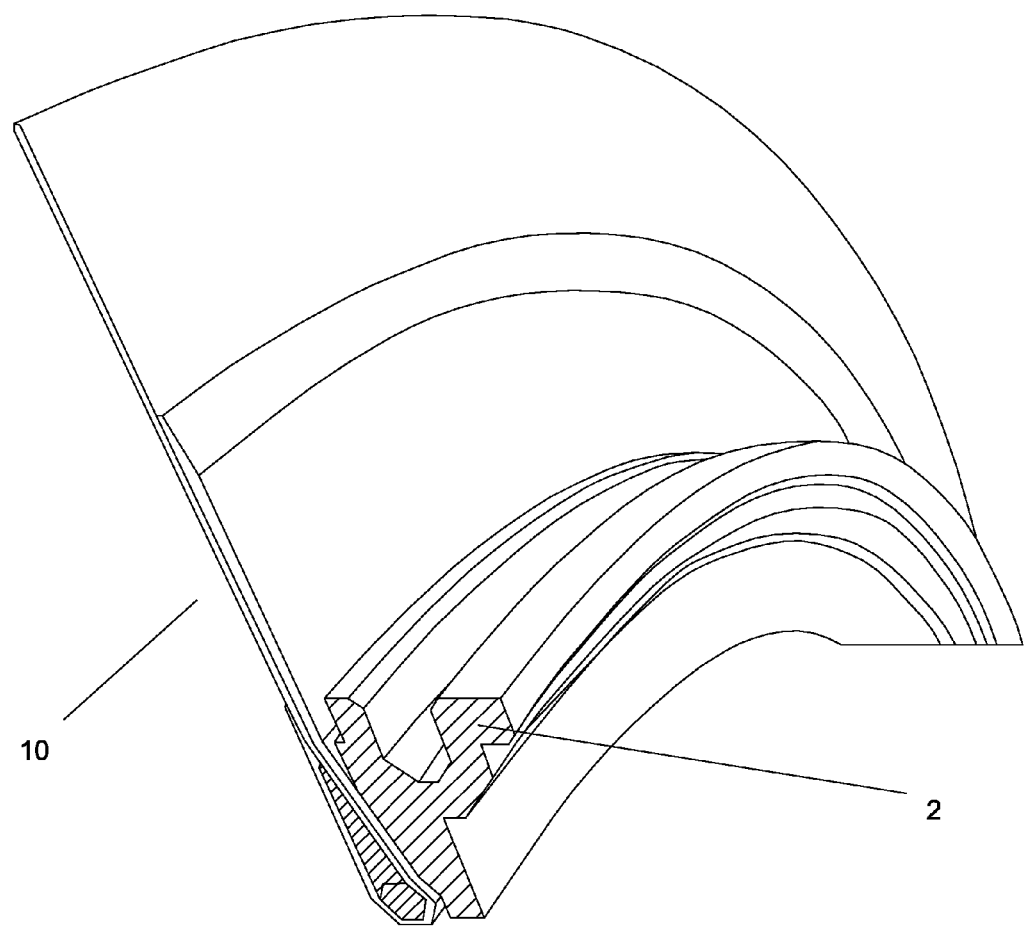
FIG. 9 shows how the disk-shaped monocomponent can be held by the mold hub.

To remove this completed assembly of the monocomponent 10, the molded hub 2 is brought back into position over the first stage building drum 50, bead locks 54 are retracted and the bead released and the molded hub 2 can magnetically or by the use of pins grab the monocomponent 10 in such a fashion that it can be withdrawn over the first stage building drum 50 and held as illustrated in FIG. 9.

Figure 7:
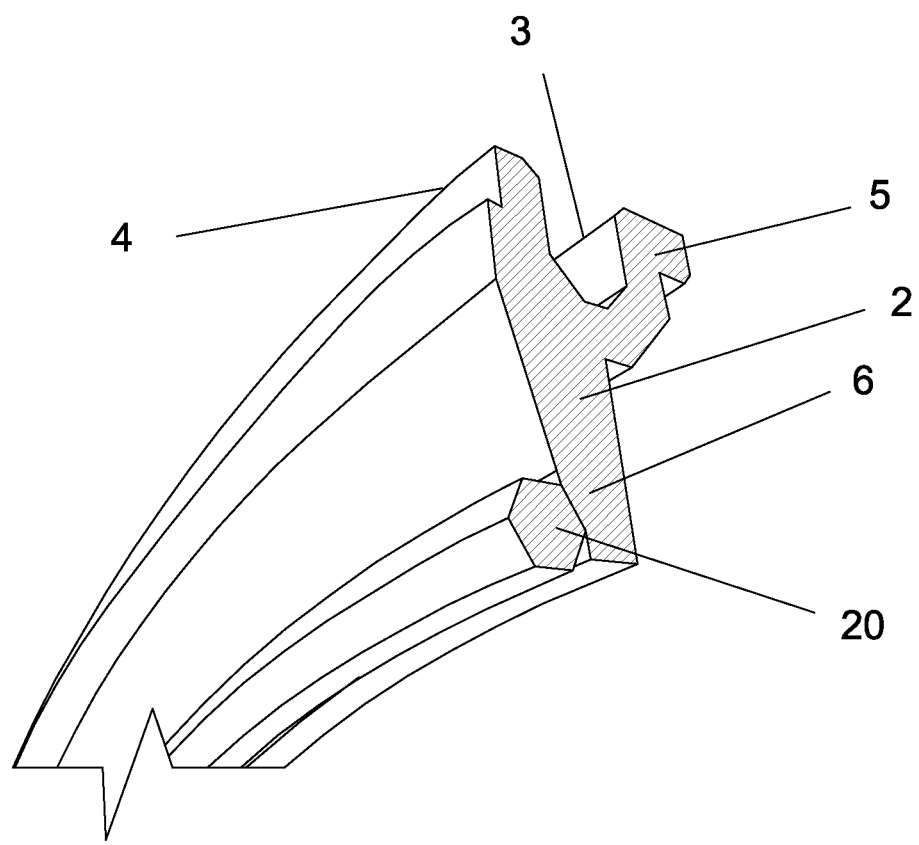
FIG. 7 is a partial view of the molded hub shown holding a bead core.
Figure 8:
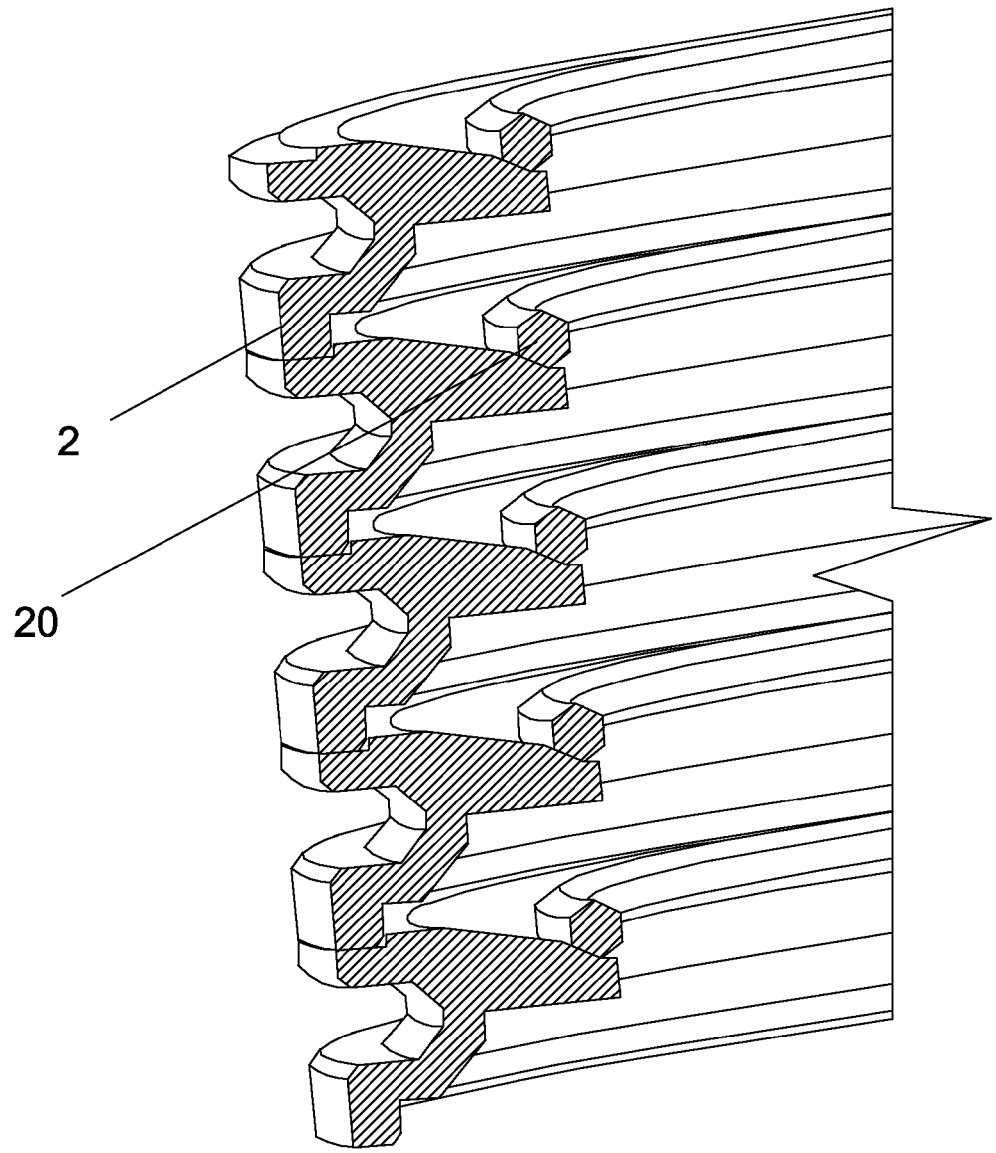
FIG. 8 shows a stack of molded hubs.

As shown in FIGS. 7 and 8, the molded hub 2 is shown in a cross sectional view holding onto a bead core 20. The bead core 20 can be held magnetically or by the use of pins that will center the bead core 20 relative to the molded hub 2. The molded hub 2 acts as a bead holder in the first stage building process. As shown it has an external groove 3 that can register on centering the yokes on building machines. These centering yokes are fundamentally robotic pieces of equipment that move the molded hub 2 into position over the bead locks 54. Although, not illustrated, these centering yokes are common features commonly used on first stage building machines. As shown by providing the molded hubs 2 with a projecting portion 5 on one side of the external groove 3 and a recess 4 on the opposite side, it is possible to stack the molded hubs 2 in such a fashion that they can hold a plurality of bead cores 20 in a stacked fashion as shown in FIG. 8. This stacking of the bead cores 20 enables a plurality of bead cores 20 to be in position ready to be brought to the modified first stage building machine 50.

Once the monocomponent 10 is completed, the molding hub 2 without bead cores 20 can be used as a storage device for the monocomponents 10, as such when the monocomponent 10 is completed the molded hub 2 is put back over the first stage building machine 50 and it can capture the monocomponent 10 either magnetically or with the use of pins and bring a monocomponent 10 off of a first stage building machine 50 where it can be stacked for storage. These monocomponents 10 provide all the sidewall features necessary to build a split ply pneumatic tire as previously discussed. Once completed, these flat disk-shaped monocomponents 10 can be stored and brought into production to make a finished product as required.

While split tires are known, and the use of split ply tires with inside turnups are also known in the prior art, it is believed that such a manufacture of disk-shaped monocomponents has never been attempted. This provision of making the monocomponent into a disk-shape such that it is suitable for use in the second stage building means that all the components necessary to build the sidewall of a tire including the gum chafer 11, the bead core 20, the apex 30, the ply turnup 14, sidewall ply 12 and sidewall rubber 40 are all pre-assembled into a single monocomponent 10. Accordingly while bringing this single monocomponent 10 to a second stage building machine as previously discussed, the only steps left are to provide a center crown ply 16 that extends between two opposing monocomponents 10 with the ends 12 stitched and this can be done in a radially and toroidaly expanded condition such that the ply strips are stitched about an expandable toroidal mandrel and as stitched, are stitched in a fashion most closely replicating the finished product. Once this is accomplished the belt reinforcing structure 17, 18 can be overlayed over the crown center ply 16 and the stitched ends 13 of the ply strips 12 such that a secure assembled split ply casing has been constructed. Once that is accomplished, the tread 19 can be applied onto the casing and the tread 19 has lateral ends that will extend to the sidewall rubber 40 on each side of the tire completing the split ply unvulcanized green tire ready for molding. This greatly simplifies the production steps required to produce such a tire and as such can reduce the cost dramatically in the production of such a tire. The advantage is that the turnups 14 are inside and that both sides of the tire are made from two identical components, one being flipped 180 degrees relative to the other to enable the ply turnups 14 to be positioned inwardly on both sides of the tire 100. Once this is accomplished, these components can make a tire 100 with improved bead durability and handling characteristics. While shown the split ply disk-shaped monocomponent 10 is shown utilizing a radial ply strip 12 reinforced by radially extending ply cords 7 which can be textile, synthetic, steel or any other material used in the construction of carcass plies. Alternatively, other angular orientations can be attempted in the sidewall area of the split ply 12 if so desired. Similarly while the tire 100 is shown as a single ply reinforcement, it is possible to make a bias tire in this fashion by simply providing two layers of ply strips 12 if so desired. In doing so the two layers of ply strips could have opposing angles, however they would be provided in the first stage building as shown in multiple layers as shown in FIG. 1, but with two layers. While not illustrated, it is important to understand that a bias tire could be made in this fashion. While this is not preferred due to the added cost, it is important to note that more than one ply strip can be added if more reinforcement is needed in the sidewall area. This is important in that elastomeric material could be positioned between the two ply strips to provide a limited runflat capability if so desired. These and other features are possible with the use of the disk-shaped monocomponent 10 as described and shown herein.

The invention has been described with reference to a best mode. Obviously, modifications and alterations will occur to others upon reading and understanding of this specification. It is intended to include all such modifications and alterations in so far as they come within the scope of the appended claims or the equivalents thereof.

What is claimed is:

1. An intermediate article of manufacture formed as a first stage bead area subsassembly for a split ply pneumatic tire carcass, the bead area subsassembly comprising:
   an annular bead core having an axis;
   a bead apex;
   a ply strip reinforced by cords, the ply strip having a main portion including a working ply or outside portion extending to a radially outer end positioned on one side of the subsassembly and having an outer surface for affixing a rubber or elastomeric sidewall portion along a portion of the outside or working ply portion that is vertical and an intermediate portion that follows the contour of the bead apex;
   said ply strip further comprising a vertical turnup, as oriented relative to the bead axis, extending along an opposite side of the bead apex and extending radially outwardly from the bead core, wherein said bead apex is similarly vertical relative to the bead axis;
   a sidewall affixed to the ply strip;
   wherein the subsassembly is formed into a generally flat disk-shaped bead area monocomponent; and wherein
   a gum chafer is applied to the outside of the ply strip and wrapped around the bead core, the chafer being a durable rubber element to prevent chafing.

2. The intermediate article of manufacture formed as a first stage bead area subassembly for a split ply pneumatic tire carcass of claim 1 wherein the ply turnup is oriented extending inside or axially inward of the bead core and final assembly on the working ply portion is oriented outside or axially outward of the bead core to which the sidewall rubber or elastomer can be applied to form a split ply tire having axially inside turnups.

3. The intermediate article of manufacture formed as a first stage bead area subassembly for a split ply pneumatic tire carcass of claim 1 wherein the cords of the ply strip are radially extending.

\* \* \* \* \*